United States Patent
Ostrovsky et al.

(10) Patent No.: US 8,806,168 B2
(45) Date of Patent: Aug. 12, 2014

(54) PRODUCER-CONSUMER DATA TRANSFER USING PIECEWISE CIRCULAR QUEUE

(75) Inventors: Igor Ostrovsky, Bellevue, WA (US); Stephen H. Toub, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 277 days.

(21) Appl. No.: 13/230,833

(22) Filed: Sep. 12, 2011

(65) Prior Publication Data
US 2013/0067160 A1    Mar. 14, 2013

(51) Int. Cl.
*G06F 12/02* (2006.01)

(52) U.S. Cl.
USPC ............ 711/170; 711/154; 711/156; 719/314

(58) Field of Classification Search
USPC ............................ 711/170, 154, 156; 719/314
See application file for complete search history.

(56) References Cited

U.S. PATENT DOCUMENTS

| | | | | |
|---|---|---|---|---|
| 5,657,471 A * | 8/1997 | Lary et al. | ...................... | 711/154 |
| 5,883,904 A * | 3/1999 | Arimilli et al. | ................ | 714/710 |
| 6,958,973 B1 * | 10/2005 | Chen et al. | ..................... | 370/235 |
| 7,269,697 B1 * | 9/2007 | Reeve et al. | .................... | 711/148 |
| 7,330,927 B1 * | 2/2008 | Reeve et al. | ....................... | 711/1 |
| 7,342,934 B1 * | 3/2008 | Mott et al. | .................... | 370/412 |
| 8,543,743 B2 * | 9/2013 | Eilebrecht | ....................... | 710/52 |
| 2009/0249356 A1 | 10/2009 | He et al. | | |
| 2010/0070730 A1 | 3/2010 | Pop et al. | | |
| 2010/0192161 A1 * | 7/2010 | Eilebrecht | ...................... | 719/314 |
| 2011/0072241 A1 | 3/2011 | Chen et al. | | |
| 2011/0219208 A1 * | 9/2011 | Asaad et al. | .................... | 712/12 |

OTHER PUBLICATIONS

Gidenstam, et al., "Cache-Aware Lock-Free Queues for Multiple Producers/Consumers and Weak Memory Consistency," Proceedings of the 14th International Conference on Principles of Distributed Systems (OPODIS), pp. 302-317, (2010). Retrieved at <<http://www.par.univie.ac.at/project/peppher/publications/Published/opodis10lfq.pdf>>.

(Continued)

*Primary Examiner* — Stephen Elmore
(74) *Attorney, Agent, or Firm* — Kevin Sullivan; Raghu Chinagudabha; Micky Minhas

(57) ABSTRACT

A method includes producing values with a producer thread, and providing a queue data structure including a first array of storage locations for storing the values. The first array has a first tail pointer and a first linking pointer. If a number of values stored in the first array is less than a capacity of the first array, an enqueue operation writes a new value at a storage location pointed to by the first tail pointer and advances the first tail pointer. If the number of values stored in the first array is equal to the capacity of the first array, a second array of storage locations is allocated in the queue. The second array has a second tail pointer. The first array is linked to the second array with the first linking pointer. An enqueue operation writes the new value at a storage location pointed to by the second tail pointer and advances the second tail pointer.

20 Claims, 5 Drawing Sheets

(56) References Cited

OTHER PUBLICATIONS

Varvitsiotis, et al., "Mapping FIR Filtering on Systolic Rings," IEEE International Conference on Application Specific Array Processors, Mapping Techniques, pp. 87-101, (Sep. 2-4, 1991). Retrieved at <<http://ieeexplore.ieee.org/stamp/stamp.jsp?tp=&arnumber=238891>>.

Varadarajan, et al., "Refining Algorithm Mappings for Linear Systolic Arrays," IEEE Fifth International Symposium on Parallel Processing, pp. 151-154, (Apr. 30-May 2, 1991). Retrieved at <<http://ieeexplore.ieee.org/stamp/stamp.jsp?tp=&arnumber=153771>>.

Valvano, Jonathan W., "Developing Software in Assembly Language First in First out Queue," Brooks-Cole, pp. 4, (Nov. 15, 2005). Retrieved at <<http://users.ece.utexas.edu/~valvano/assmbly/fifo.htm>>.

CC, Kjellkod, "Lock-Free Single-Producer—Single Consumer Circular Queue," pp. 9, (Nov. 4, 2009). Retrieved at <<https://www6.software.ibm.com/developerworks/education/gr-pubsub/gr-pubsub-ltr.pdf>>.

\* cited by examiner

US 8,806,168 B2

PRODUCER-CONSUMER DATA TRANSFER USING PIECEWISE CIRCULAR QUEUE

BACKGROUND

A producer-consumer pattern is a common programming pattern employed in programming of multi-core computers or other multi-processor computers. The producer-consumer pattern includes one or more computational producer threads that produce values and one or more computational consumer threads that consume the values produced by the producer thread(s) and process the values. In one illustrative example producer-consumer pattern, one producer thread polls a web service and generates a new stock price value every time a stock price changes. In this illustrative example, one consumer thread consumes the new stock price values and responds to the stock price changes by re-evaluating a current portfolio.

In order to allow the producer thread and the consumer thread to execute concurrently, the producer thread preferably does not wait on the consumer thread. If the producer thread produces a value but the consumer thread is busy, the producer thread typically temporarily places the value into a queue data structure. When the consumer thread is ready to consume and process another value, the consumer thread checks the queue data structure for more work.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

The disclosure is directed to a producer-consumer pattern having a producer thread that produces values, a piecewise circular queue data structure for storing the produced values, and a consumer thread that consumes and processes the stored values. The piecewise circular queue includes a first array having a first tail pointer and a first linking pointer. If a number of values stored in the first array is less than a capacity of the first array, an enqueue operation writes a new value at a storage location pointed to by the first tail pointer and advances the first tail pointer. If the number of values stored in the first array is equal to the capacity of the first array, a second array is allocated in the queue. The second array has a second tail pointer. The first array is linked to the second array with the first linking pointer. An enqueue operation writes the new value at a storage location pointed to by the second tail pointer and advances the second tail pointer.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated, as they become better understood by reference to the following detailed description. The elements of the drawings are not necessarily to scale relative to each other. Like reference numerals and other indicators (collectively alpha-numerics in this disclosure) designate corresponding similar features.

DETAILED DESCRIPTION

In the following Detailed Description, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims. It is also to be understood that features of the various exemplary embodiments described herein may be combined with each other, unless specifically noted otherwise.

Figure 1:
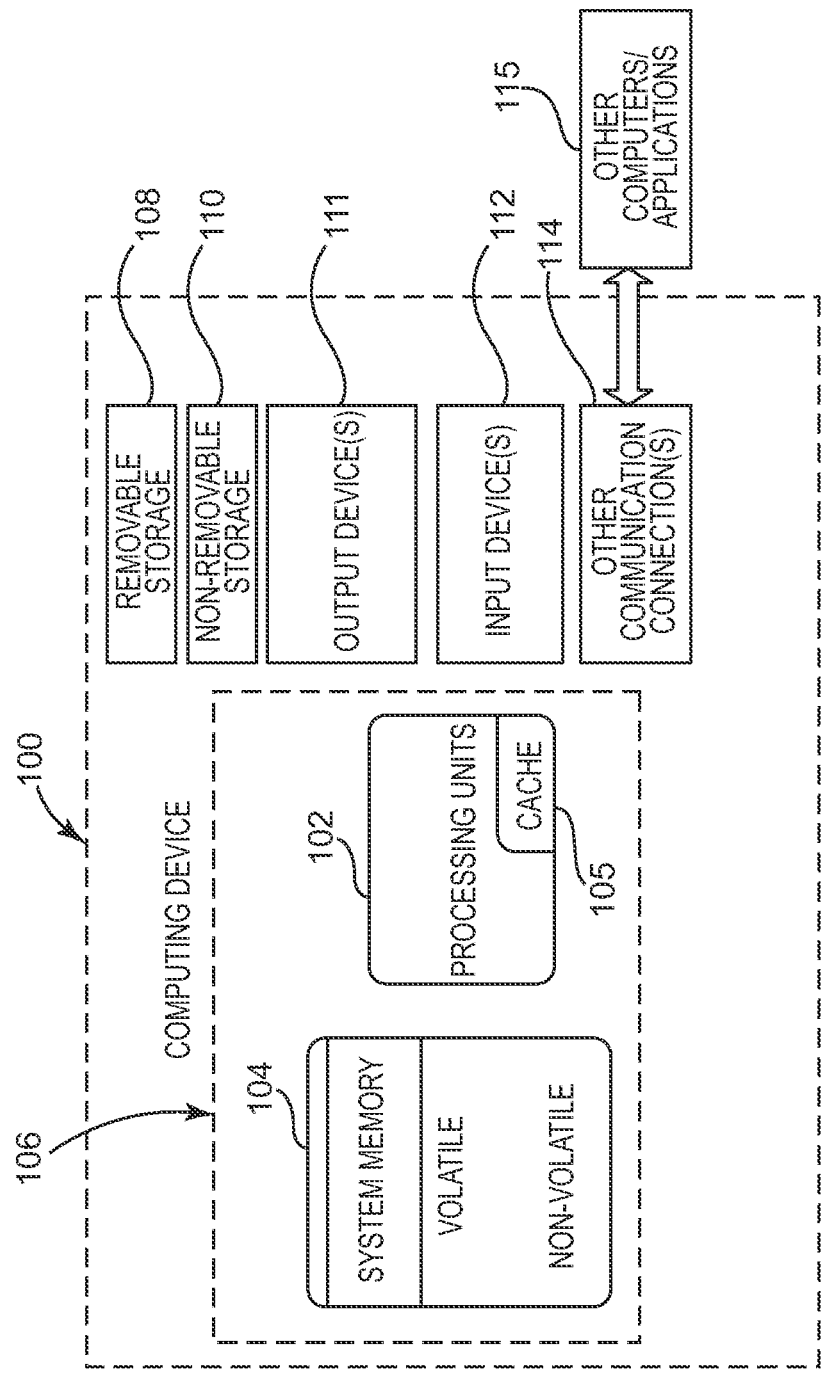
FIG. 1 is a block diagram illustrating an example computing device that can implement a producer-consumer pattern including a queue data structure.

FIG. 1 illustrates an exemplary computer system that can be employed as an operating environment includes a computing device, such as computing device 100. In a basic configuration, computing device 100 typically includes a processor architecture having at least two processing units, i.e., processors 102, and memory 104. Depending on the exact configuration and type of computing device, memory 104 may be volatile (such as random access memory (RAM)), nonvolatile (such as read only memory (ROM), flash memory, etc.), or some combination of the two. Each of the processing units include a cache 105 interposed between the processor 102 and the memory 104. This basic configuration is illustrated in FIG. 1 by line 106. The computing device can take one or more of several forms. Such forms include a personal computer, a server, a handheld device, a consumer electronic device (such as a video game console), or other.

Computing device 100 can also have additional features/functionality. For example, computing device 100 may also include additional storage (removable and/or non-removable) including, but not limited to, magnetic or optical disks or solid state memory, or flash storage devices such as removable storage 108 and non-removable storage 110. Computer storage media includes volatile and nonvolatile, removable and non-removable media implemented in any suitable method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, universal serial bus (USB) flash drive, flash memory card, or other flash storage devices, or any other storage medium that can be used to store the desired information and that can be accessed by computing device 100. Any such computer storage media may be part of computing device 100.

Computing device 100 includes one or more communication connections 114 that allow computing device 100 to communicate with other computers/applications 115. Computing device 100 may also include input device(s) 112, such as keyboard, pointing device (e.g., mouse), pen, voice input device, touch input device, etc. Computing device 100 may also include output device(s) 111, such as a display, speakers, printer, etc.

The computing device 100 can be configured to run an operating system software program and one or more software applications, which make up a system platform. In one example, the computing device 100 includes a software component referred to as a managed environment. The managed environment can be included as part of the operating system or can be included later as a software download. The managed environment typically includes pre-coded solutions to common programming problems to aid software developers to create software programs such as applications to run in the managed environment, and it also typically includes a virtual machine that allows the software applications to run in the managed environment so that the programmers need not consider the capabilities of the specific processors 102. A managed environment can include cache coherency protocols and cache management algorithms.

The computing device 100 can be coupled to a computer network, which can be classified according to a wide variety of characteristics such as topology, connection method, and scale. A network is a collection of computing devices and possibly other devices interconnected by communications channels that facilitate communications and allows sharing of resources and information among interconnected devices. Examples of computer networks include a local area network, a wide area network, the Internet, or other network.

Figure 2:
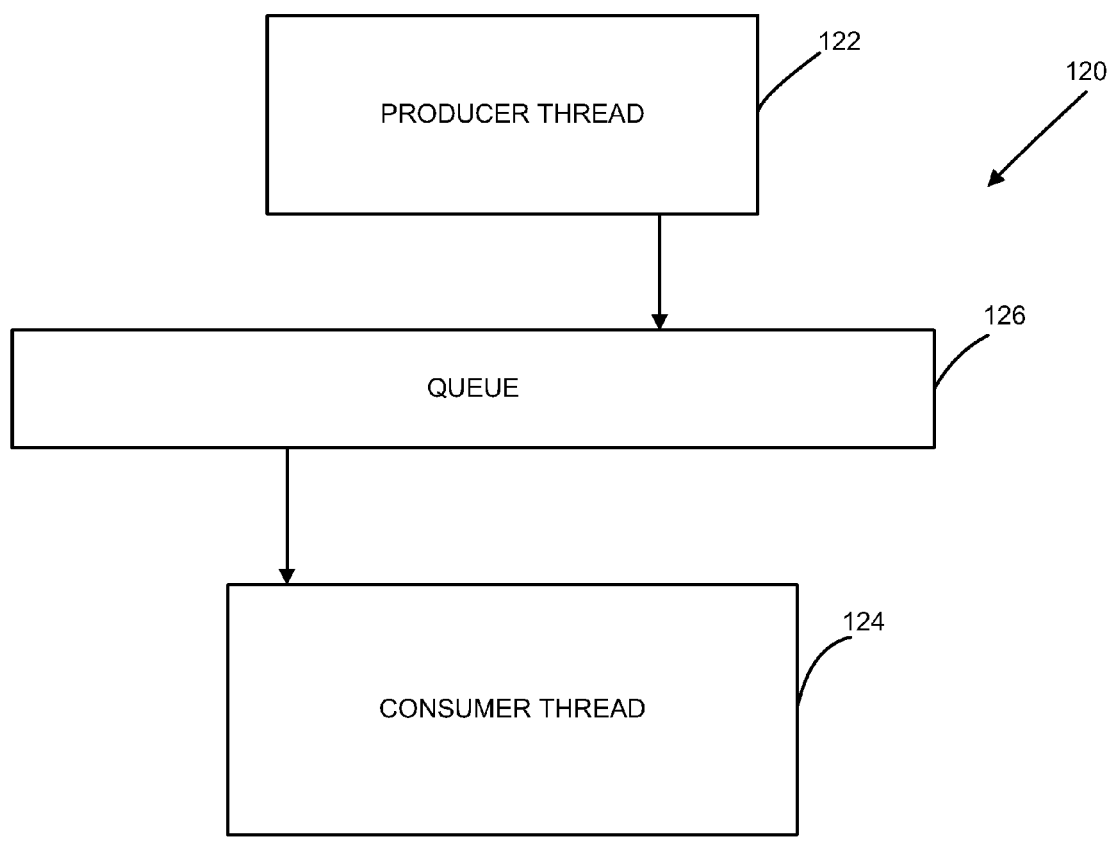
FIG. 2 is a diagram illustrating an example embodiment of a producer-consumer pattern including a queue data structure.

An example embodiment of a producer-consumer pattern 120 that can be implemented on computing device 100 or other suitable computing device is illustrated in FIG. 2. Producer-consumer pattern 120 includes at least one computational producer thread 122 that produces values. At least one computational consumer thread 124 consumes the values produced by producer thread 122 and process the values. In some implementations of producer-consumer pattern 120, producer thread 122 and consumer thread 124 are the same thread.

Producer-consumer pattern 120 includes a queue data structure 126, which facilitates concurrent execution of producer thread 122 and consumer thread 124. In one embodiment, when producer thread 122 produces a value and consumer thread 124 is busy, producer thread 122 stores the value into queue data structure 126. In one embodiment, when producer thread 122 produces a value, producer thread 122 stores the value into queue data structure 126 regardless if consumer thread 124 is busy. In either embodiment, when consumer thread 124 is ready to consume and process a value, consumer thread 124 checks queue data structure 126 for a new value to consume and process.

Figure 3:
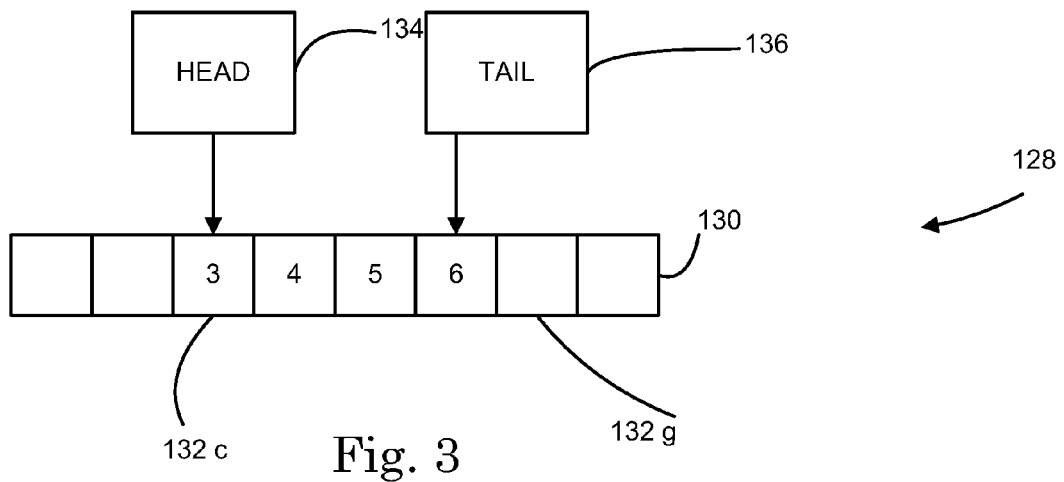
FIG. 3 is a diagram illustrating an example producer-consumer pattern operation in a circular queue.
Figure 4:
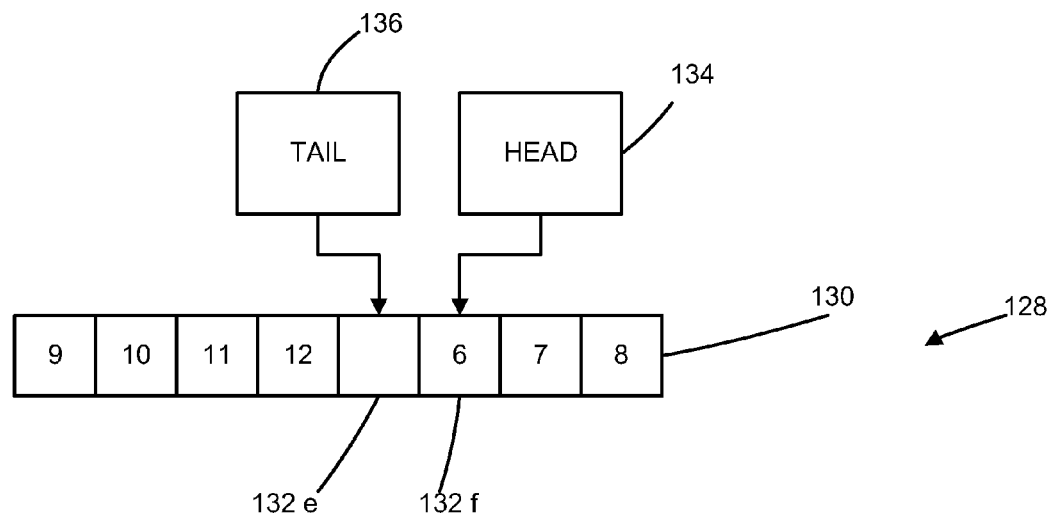
FIG. 4 is a diagram illustrating an example producer-consumer pattern operation in a circular queue.
Figure 5:
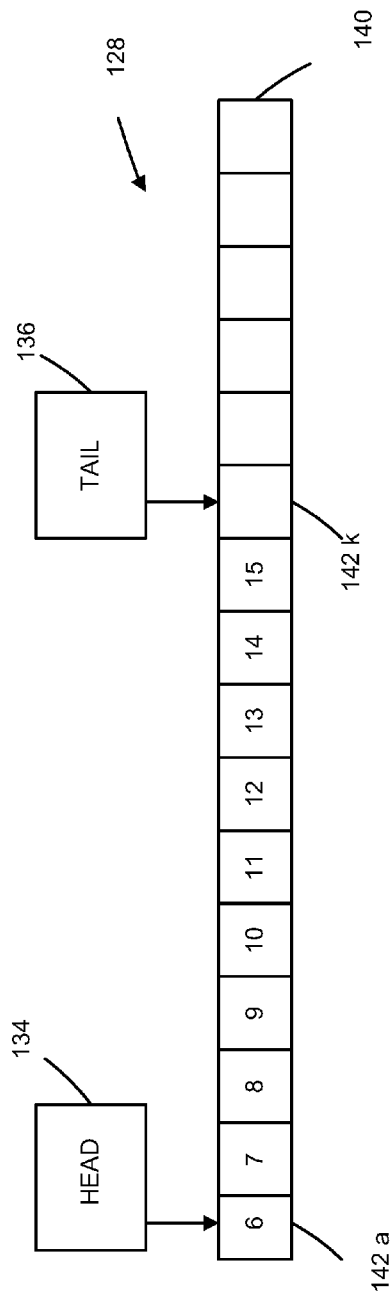
FIG. 5 is a diagram illustrating an example producer-consumer pattern operation in a circular queue.

FIGS. 3-5 illustrate an example producer-consumer pattern operation in a circular queue data structure 128 having first-in-first-out semantics implemented in a producer-consumer pattern (e.g., producer-consumer pattern 120) that can be implemented on computing device 100 or other suitable computing device. Circular queue 128 supports an enqueue operation that inserts a new value into the queue. Circular queue 128 supports a dequeue operation that removes an oldest value in the queue.

As illustrated in FIG. 3, circular queue 128 includes a first array 130 of storage locations (e.g., storage locations 132*c* and 132*g*). FIG. 3 illustrates circular queue 128 after six enqueue operations which insert values {1, 2, 3, 4, 5, 6}, and two dequeue operations which remove values {1, 2}. A head pointer 134 points at storage location 132*c* of a next value {3} to be dequeued. A tail pointer 136 points at storage location 132*g* where a next enqueue operation is to store a new value. The next enqueue operation will write a value {7} at storage location 132*g* pointed to by tail pointer 136 and advance the tail pointer. A next dequeue operation reads the value {3} at storage location 132*c* pointed to by head pointer 134 and advances the head pointer.

FIG. 4 illustrates circular queue 128 after twelve enqueue operations which insert values {1, 2, 3, 4, 5, 6, 7, 8, 9, 10, 11, 12}, and five dequeue operations which remove values {1, 2, 3, 4, 5}. Head pointer 134 points at a storage location 132*f* of a next value {6} to be dequeued. Tail pointer 136 points at a storage location 132*e* where a next enqueue operation is to store a new value. As illustrated in FIG. 4, as values are enqueued and dequeued from first array 130 of circular queue 128, head pointer 134 and tail pointer 136 wrap around, such that tail pointer 136 precedes head pointer 134. As long as a number of values stored in first array 130 is less than a capacity of the first array, head pointer 134 and tail pointer 136 can continue moving and wrapping around the first array.

FIG. 5 illustrates an example producer-consumer pattern operation when the number of values stored in first array 130 is equal to (i.e., reaches) the capacity of the first array. When the capacity of first array 130 is reached, if another enqueue operation is performed before another dequeue operation, first array 130 cannot hold all of the values of circular queue 128. For this reason, circular queue 128 will allocate a second array 140 of storage locations (e.g., storage locations 142*a* and 142*k*). Second array 140 is allocated to be larger than first array 130 (e.g., twice as large). All values stored in first array 130 are copied into second array 140.

FIG. 5 illustrates circular queue 128 after fifteen enqueue operations (i.e., three more than illustrated in FIG. 4) which insert values {1, 2, 3, 4, 5, 6, 7, 8, 9, 10, 11, 12, 13, 14, 15}, and five dequeue operations (i.e., the same number as illustrated in FIG. 4) which remove values {1, 2, 3, 4, 5}. Head pointer 134 points at storage location 142*a* of a next value {6} to be dequeued. Tail pointer 136 points at storage location 142*k* where a next enqueue operation is to store a new value.

The example producer-consumer pattern operation in circular queue data structure 128 works well in scenarios where a single computational thread is the computational producer thread performing the enqueue operation and the computational consumer thread performing the dequeue operation. In scenarios of the example producer-consumer pattern operation in circular queue 128 where a first computational thread is the computational producer thread performing the enqueue operation and a second (i.e., different) computational thread is the computational consumer thread performing the dequeue operation, circular queue 128 can be protected by a mutual exclusion mechanism (MUTEX) to ensure that only one computational thread at a time can access circular queue 128.

Figure 6:
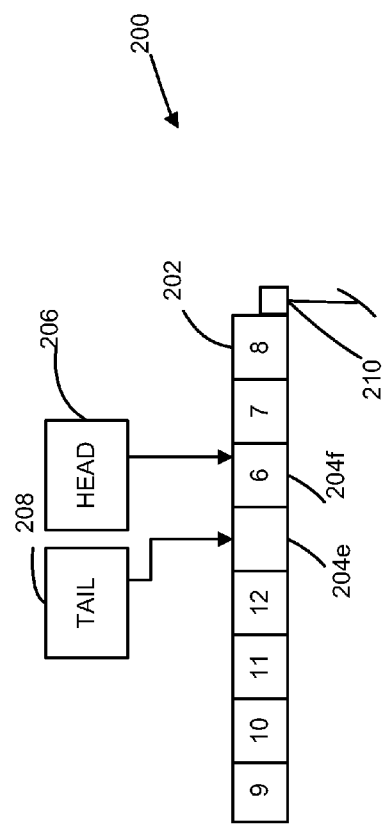
FIG. 6 is a diagram illustrating an example producer-consumer pattern operation in a piecewise circular queue.
Figure 7:
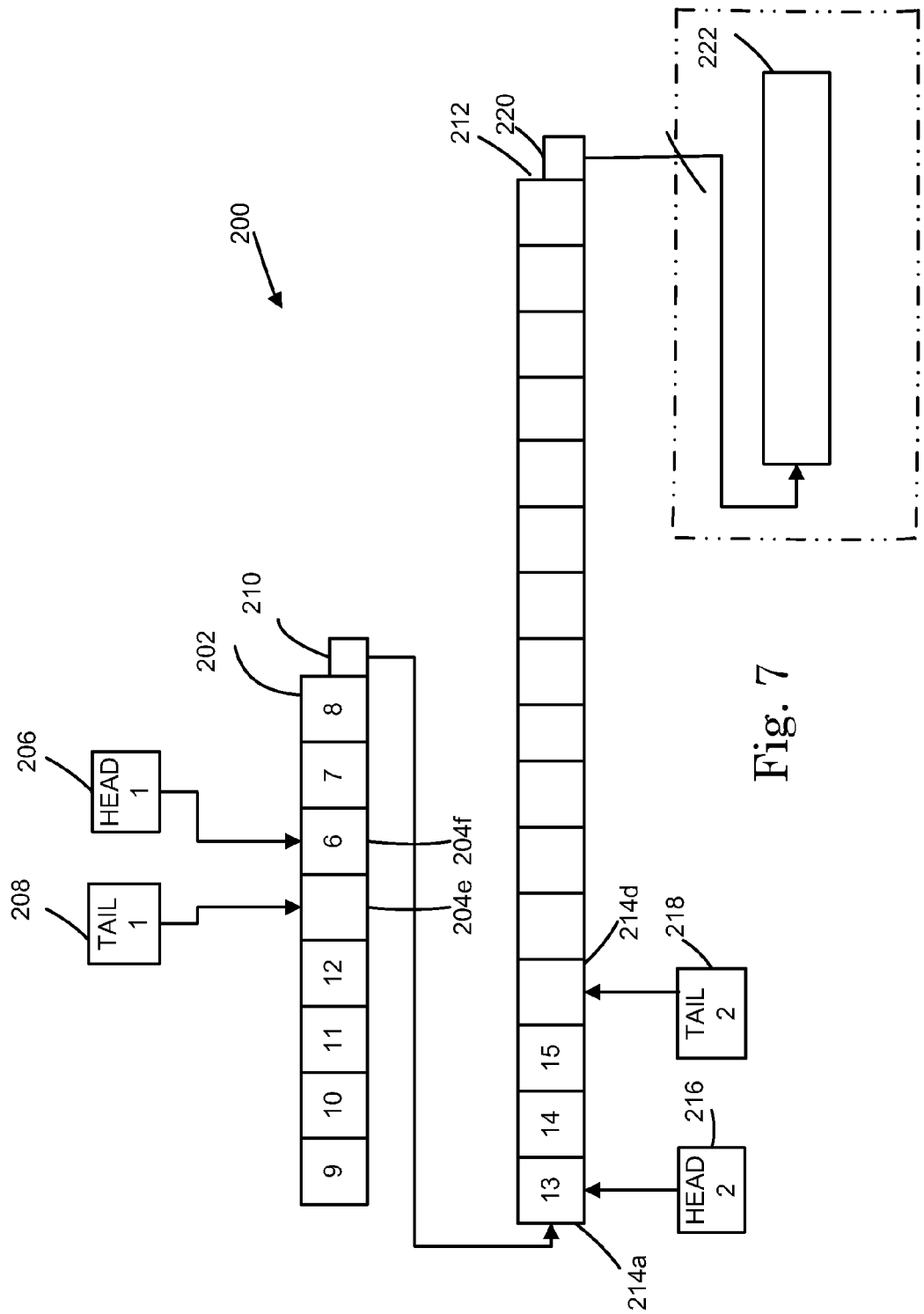
FIG. 7 is a diagram illustrating an example producer-consumer pattern operation in a piecewise circular queue.

FIGS. 6-7 illustrate an example producer-consumer pattern operation implemented in a producer-consumer pattern (e.g., producer-consumer pattern 120) employing a piecewise circular queue data structure 200 having first-in-first-out semantics that can be implemented on computing device 100 or other suitable computing device. Piecewise circular queue 200 supports an enqueue operation that inserts a new value into the piecewise circular queue. Piecewise circular queue 200 supports a dequeue operation that removes an oldest value in the piecewise circular queue.

As illustrated in FIG. 6, piecewise circular queue 200 includes a first array 202 of storage locations (e.g., storage locations 204e and 204f). FIG. 6 illustrates piecewise circular queue 200 after twelve enqueue operations which insert values {1, 2, 3, 4, 5, 6, 7, 8, 9, 10, 11, 12}, and five dequeue operations which remove values {1, 2, 3, 4, 5}. A head pointer 206 points at storage location 204f of a next value {6} to be dequeued. A tail pointer 208 points at a storage location 204e where a next enqueue operation is to store a new value. The next enqueue operation will write a value {13} at storage location 204e pointed to by tail pointer 208 and advance the tail pointer. A next dequeue operation reads the value {6} at storage location 204f pointed to by head pointer 206 and advances the head pointer.

As illustrated in FIG. 6, as values are enqueued and dequeued from first array 202 of piecewise circular queue 200, head pointer 206 and tail pointer 208 wrap around, such that tail pointer 208 precedes head pointer 206. As long as a number of values stored in first array 202 is less than a capacity of first array 202, head pointer 206 and tail pointer 208 can continue moving and wrapping around first array 202.

In an example producer-consumer pattern operation when a number of values stored in first array 202 is equal to (i.e., reaches) the capacity of first array 202, if another enqueue operation is performed before another dequeue operation, first array 202 cannot hold all of the values of piecewise circular queue 200. As illustrated in FIG. 7, when the number of values stored in first array 202 reaches the capacity of the first array, piecewise circular queue 200 will allocate a second array 212 of storage locations (e.g., storage locations 214a and 214d). In one embodiment, second array 212 is allocated to be larger than first array 202 (e.g., twice as large). In one embodiment, second array 212 is allocated based on the size of first array 202. In an example producer-consumer pattern operation with piecewise circular queue 200, no values stored in first array 202 are copied into second array 212. Instead, first array 202 of piecewise circular queue 200 includes a first linking pointer 210, which links first array 202 to second array 212.

FIG. 7 illustrates piecewise circular queue 200 after fifteen enqueue operations (i.e., three more than illustrated in FIG. 6) which insert values {1, 2, 3, 4, 5, 6, 7, 8, 9, 10, 11, 12, 13, 14, 15}, and five dequeue operations (i.e., the same number as illustrated in FIG. 6) which remove values {1, 2, 3, 4, 5}. Head pointer 206 points at storage location 204f of a value {6} to be dequeued. Tail pointer 136 points at a storage location 204e where a next enqueue operation is to store a new value. Second array 212 includes a head pointer 216 which points at storage location 214a of a next value {13} to be dequeued. Tail pointer 218 points at storage location 214d where a next enqueue operation is to store a new value.

In an example producer-consumer pattern operation when a number of values stored in second array 212 is equal to (i.e., reaches) the capacity of second array 212, if another enqueue operation is performed before another dequeue operation, first array 202 and second array 212 cannot hold all of the values of piecewise circular queue 200. When the number of values stored in second array 212 reaches the capacity of the second array, piecewise circular queue 200 will allocate a third array 222 of storage locations. In one embodiment, third array 222 is allocated to be larger than second array 212 (e.g., twice as large). In one embodiment, second array 212 is allocated based on the size of first array 202 and third array 222 is allocated based on the size of second array 212. In one embodiment, second array 212 is allocated to be greater in size than first array 202 at a first growth rate, and third array 222 is allocated to be greater in size than second array 212 at a second growth rate which is different than the first growth rate. In an example producer-consumer pattern operation with piecewise circular queue 200, no values stored in second array 202 are copied into third array 222. Instead, second array 212 of piecewise circular queue 200 includes a second linking pointer 220, which links second array 212 to third array 222.

Piecewise circular queue 200 is a circular queue that can be optimized to be employed in a producer-consumer pattern with one computational producer thread that performs enqueue operations and one computational consumer thread that performs dequeue operations. In embodiments, the one computational producer thread and the one computational consumer thread can be the same thread or different threads. When the computational producer thread and the computational consumer thread are different, it is still possible to have the different computational threads be executing concurrently and maintain good performance. It is possible to employ a circular queue, such as circular queue 128, and have different currently executing computational threads if protected by a MUTEX. Due to the cost of acquiring and releasing MUTEX, and the limit on concurrency imposed by the MUTEX, the producer-consumer pattern performance of this circular queue 128 protected by MUTEX scenario, would be significantly worse compared to the performance of a producer-consumer pattern employing piecewise circular queue 200 and different computational threads executing concurrently.

In operation of piecewise circular queue 200 after second array 212 is allocated and linked to first array 202 with first linking pointer 210, the computational producer thread begins inserting values into the new second array 212. The computational consumer thread, however, will first pull all values from the old first array 202 before beginning to consume values from the new second array 212. If the computational producer thread produces values at a rate that gets ahead of the computational consumer thread even further, such that the capacity of second array is reached, third array 222 is allocated and linked to second array 212 with second linking pointer 220. If the computational producer thread produces values at a rate that gets ahead of the computational consumer thread even further, such that the capacity of third array 222 is reached, a fourth array is allocated and linked to third array 222 with a third linking pointer. Additional arrays beyond four arrays can be allocated and linked in this way as the corresponding arrays reach capacity. Effectively, the linked arrays in piecewise circular queue 200 form a linked list that will be processed by the computational consumer thread. In embodiments where the size of each array increases based on the size of the previous array (e.g., twice the size), the array sizes grow significantly (e.g., exponentially), so the linked list will not typically be very long.

Embodiments of piecewise circular queues, such as piecewise circular queue 200, can easily implement both enqueue and dequeue operations without MUTEX, and even without interlocked operations. Interlocked operations are relatively expensive atomic operations (e.g., compare-and-swap) that are often employed to implement concurrent data structures.

Dynamic memory allocations are costly on modern computing devices. Embodiments of piecewise circular queues, such as piecewise circular queue 200, typically employ relatively few dynamic memory allocations. In an example embodiment of piecewise circular queue 200 which allocates a new linked array to be double the size of the previous linked array, the array sizes grow at an exponential rate which significantly reduces dynamic memory allocations. For example, even if piecewise circular queue 200 grows to contain a billion values, such an array size is achieved in approximately 30 array allocations. As a result, embodiments of piecewise circular queues, such as piecewise circular queue 200, typically employ few array allocations at the beginning of the producer-consumer pattern operation until the piecewise circular queue reaches an appropriate size, and then typically do not perform any further allocations after the appropriate size is reached. One implementation of piecewise circular queue 200 employs an array growth rate policy that grows the arrays at a different rate or that otherwise employs the piecewise circular queue's own heuristics to determine the size of the new linked array based on appropriate information, such as the previous linked array.

The above described example producer-consumer pattern operations employing piecewise circular queue 200 can be further optimized to improve performance in certain scenarios on modern computing devices. In the below examples, only the frequently employed events (i.e., "hot path") of the enqueue and the dequeue operations are optimized. For the purposes of this optimization analysis, the enqueue and deqeueue operations are simplified to ignore rare events (i.e., "cold path"), such as allocation of new arrays in piecewise circular queue 200.

An example hot-path enqueue operation is: 1) read the head pointer and the tail pointer to verify that the current linked array has room for another value; and 2) advance the tail pointer.

An example hot-path dequeue operation is: 1) read the head pointer and the tail pointer to verify that the current linked array contains at least one stored value; and 2) advance the head pointer.

These hot-path enqueue and equeue operations can perform sub-optimally for the memory and cache hierarchy employed in modern computing devices. In each hot-path enqueue operation, the producer thread modifies the tail pointer to advance the tail pointer. In each hot-path dequeue operation, the consumer thread reads the tail pointer to verify that the current linked array in piecewise circular queue 200 is not empty. The consumer thread read of the tail pointer in the dequeue operation results in a cache miss, because one computational core (i.e, the consumer thread) is reading a memory value that was just modified by another computational core (i.e., the producer thread). Consequently, the computational core reading the value cannot simply obtain the value from its own cache, because the cached value is now invalid. A cache miss results in a significant performance hit on modern computing device architectures.

One embodiment of piecewise circular queue 200 addresses this problem by having the consumer thread read the tail pointer and then store a local copy of the tail pointer. The local copy of the tail pointer is only refreshed when the local copy of the tail pointer is not sufficient to indicate whether the current linked array contains at least one stored value, which occurs when the head pointer and the local copy of the tail pointer indicate that the current linked array contains no stored values. The consumer thread can continue employing the local copy of the tail pointer until the head pointer catches the local copy of the tail pointer. At that point, the consumer thread takes a cache miss in order to refresh the local copy of the tail pointer. In common scenarios of producer-consumer pattern operations employing piecewise circular queue 200, the consumer thread will rarely refresh the local copy of the tail pointer, and so most hot-path dequeue operations do not result in a cache miss.

Similarly, the producer thread reads the head pointer on each hot-path enqueue operation, but the head pointer is modified by the consumer thread on each hot-path dequeue operation. Thus, the producer thread read of the head pointer in the enqueue operation results in a cache miss, because one computational core (i.e, the producer thread) is reading a memory value that was just modified by another computational core (i.e., the consumer thread). Consequently, the computational core reading the value cannot simply obtain the value from its own cache, because the cached value is now invalid.

One embodiment of piecewise circular queue 200 similarly addresses this problem for the producer thread by having the producer thread read the head pointer and then store a local copy of the head pointer. The local copy of the head pointer is only refreshed when the local copy of the head pointer is not sufficient to indicate whether the current linked array has room for another value, which occurs when the tail pointer and the local copy of the head pointer indicate that the number of values stored in the current linked array is equal to the capacity of the current linked array. The producer thread can continue employing the local copy of the head pointer until the capacity of the current linked array is reached. At that point, the producer thread takes a cache miss in order to refresh the local copy of the head pointer. In common scenarios of producer-consumer pattern operations employing piecewise circular queue 200, the producer thread will rarely refresh the local copy of the head pointer, and so most hot-path enqueue operations do not result in a cache miss.

In these further performance optimized example producer-consumer pattern operations employing piecewise circular queue 200, the consumer thread stores the head pointer and a local copy of the tail pointer for each of the linked arrays, and the producer thread stores a local copy of the head pointer and the tail pointer for each of the linked arrays. In typical hot-path enqueue and dequeue operations, both the consumer thread and the producer thread can make decisions based on their local data, with no cache misses occurring. Occasionally on cold path dequeue operations, the consumer takes a cache miss in order to refresh its local copy of the tail pointer from the producer. Occasionally on cold path enqueue operations, the producer takes a cache miss in order to refresh its local copy of the head pointer from the consumer thread.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A computer readable storage medium, which does not include transitory propagating signals, storing computer-executable instructions for controlling a computing device to perform a method comprising:
   producing values with a producer thread;
   providing a queue data structure including a first array of storage locations for storing the values, the first array having a first tail pointer and a first linking pointer;
   if a number of values stored in the first array is less than a capacity of the first array,
      performing an enqueue operation to write a new value at a storage location pointed to by the first tail pointer and advance the first tail pointer; and if the number of values stored in the first array is equal to the capacity of the first array,
  allocating a second array of storage locations in the queue, the second array having a second tail pointer;
  linking the first array to the second array with the first linking pointer; and
  performing an enqueue operation to write the new value at a storage location pointed to by the second tail pointer and advance the second tail pointer.

2. The computer readable storage medium of claim 1, wherein the queue data structure has first in first out semantics.

3. The computer readable storage medium of claim 1, wherein the method comprises:
  consuming and processing values read from the queue with a consumer thread.

4. The computer readable storage medium of claim 3, wherein the method comprises:
  the first array having a first head pointer; and
  performing a dequeue operation to read a value stored at a storage location pointed to by the first head pointer and advance the first head pointer.

5. The computer readable storage medium of claim 4, wherein the method comprises:
  the second array having a second head pointer; and
  performing a dequeue operation to read a value stored at a storage location pointed to by the second head pointer and advance the second head pointer.

6. The computer readable storage medium of claim 4, wherein the enqueue operation comprises:
  reading, with the producer thread, the first head pointer and the first tail pointer to determine if the number of values stored in the first array is less than the capacity of the first array or is equal to the capacity of the array.

7. The computer readable storage medium of claim 6, wherein the enqueue operation comprises:
  after reading the first head pointer, storing, with the producer thread, a local copy of the first head pointer, which is only refreshed when the local copy of the first head pointer is not sufficient to indicate whether the first array has room for another value which occurs when the first tail pointer and the local copy of the head pointer indicate that the number of values stored in the first array is equal to the capacity of the first array.

8. The computer readable storage medium of claim 4, wherein the dequeue operation comprises:
  reading, with the consumer thread, the first head pointer and the first tail pointer to determine if the first array contains at least one stored value.

9. The computer readable storage medium of claim 6, wherein the enqueue operation comprises:
  after reading the first tail pointer, storing, with the consumer thread, a local copy of the first tail pointer, which is only refreshed when the local copy of the first tail pointer is not sufficient to indicate whether the first array contains at least one stored value which occurs when the first head pointer and the local copy of the tail pointer indicate that the first array contains no stored values.

10. The computer readable storage medium of claim 1, wherein allocating the second array comprises:
  allocating the second array to be greater in size than the first array.

11. The computer readable storage medium of claim 1, wherein allocating the second array comprises:
  allocating the second array based on the size of the first array.

12. The computer readable storage medium of claim 1, wherein allocating the second array comprises:
  allocating the second array to be twice the size of the first array.

13. The computer readable storage medium of claim 1, wherein the method comprises:
  the second array having a second linking pointer; and
  if the number of values stored in the second array is equal to the capacity of the second array,
    allocating a third array of storage locations in the queue, the third array having a third tail pointer;
    linking the second array to the third array with the second linking pointer; and
    performing an enqueue operation to write the new value at a storage location pointed to by the third tail pointer and advance the third tail pointer.

14. The computer readable storage medium of claim 13, wherein allocating the third array comprises:
  allocating the third array to be greater in size than the second array.

15. The computer readable storage medium of claim 13, wherein allocating the third array comprises:
  allocating the third array based on the size of the second array.

16. The computer readable storage medium of claim 13, wherein allocating the third array comprises:
  allocating the third array to be twice the size of the second array.

17. The computer readable storage medium of claim 9, wherein the method comprises:
  allocating the second array to be greater in size than the first array at a first growth rate; and
  allocating the third array to be greater in size than the second array at a second growth rate which is different than the first growth rate.

18. A computer readable storage medium, which does not include transitory propagating signals, storing computer-executable instructions for controlling a computing device to perform a method comprising:
  providing a queue data structure including a first array of storage locations and second array of storage locations for storing values, the first array having a first head pointer and a first linking pointer which links the first array to the second array, the second array having a second head pointer;
  consuming and processing values read from the queue with a consumer thread;
  performing a first dequeue operation to read a value stored at a storage location pointed to by the first head pointer and advance the first head pointer; and
  performing a second dequeue operation to read a value stored at a storage location pointed to by the second head pointer and advance the second head pointer.

19. A method performed by a computing device, the method comprising:
  producing values with a producer thread;
  providing a queue data structure including a first array of storage locations for storing the values, the first array having a first tail pointer, a first head pointer, and a first linking pointer;
  reading, with the producer thread, the first head pointer and the first tail pointer;

storing, with the producer thread, a local copy of the first head pointer, which is only refreshed when the local copy of the first head pointer is not sufficient to indicate whether the first array has room for another value which occurs when the first tail pointer and the local copy of the head pointer indicate that the number of values stored in the first array is equal to the capacity of the first array;

if a number of values stored in the first array is less than a capacity of the first array, performing an enqueue operation to write a new value at a storage location pointed to by the first tail pointer and advance the first tail pointer; and if the number of values stored in the first array is equal to the capacity of the first array, allocating a second array of storage locations in the queue, the second array having a second tail pointer;

linking the first array to the second array with the first linking pointer; and performing an enqueue operation to write the new value at a storage location pointed to by the second tail pointer and advance the second tail pointer.

20. The method of claim 19 comprising:

consuming and processing values read from the queue with a consumer thread;

performing a dequeue operation to read a value stored at a storage location pointed to by the first head pointer and advance the first head pointer, dequeue operation including;

reading, with the consumer thread, the first head pointer and the first tail pointer to determine if the first array contains at least one stored value;

storing, with the consumer thread, a local copy of the first tail pointer, which is only refreshed when the local copy of the first tail pointer is not sufficient to indicate whether the first array contains at least one stored value which occurs when the first head pointer and the local copy of the tail pointer indicate that the first array contains no stored values.

\* \* \* \* \*